US008210785B1

(12) United States Patent
Gager

(10) Patent No.: US 8,210,785 B1
(45) Date of Patent: Jul. 3, 2012

(54) DECORATIVE CAP AND NUT FOR TOILET BASE

(76) Inventor: Dennis J. Gager, Medford, NJ (US)

( * ) Notice: Subject to any disclaimer, the term of this patent is extended or adjusted under 35 U.S.C. 154(b) by 639 days.

(21) Appl. No.: 12/322,555

(22) Filed: Feb. 4, 2009

Related U.S. Application Data

(63) Continuation-in-part of application No. 11/999,362, filed on Dec. 5, 2007, now abandoned.

(60) Provisional application No. 60/872,978, filed on Dec. 6, 2006.

(51) Int. Cl.
*F16B 37/14* (2006.01)

(52) U.S. Cl. .......... 411/429; 411/373; 411/338; 411/553

(58) Field of Classification Search .................. 411/338, 411/439, 372.5–374, 429, 349, 549, 553
See application file for complete search history.

(56) References Cited

U.S. PATENT DOCUMENTS

| | | | | |
|---|---|---|---|---|
| 1,291,789 | A | * | 1/1919 | Doods ........................... 411/374 |
| 2,819,642 | A | * | 1/1958 | Refrigeri ....................... 411/373 |
| 2,930,049 | A | * | 3/1960 | Minella ............................. 4/417 |
| 3,148,379 | A | | 9/1964 | Muller |
| 3,241,427 | A | * | 3/1966 | Bosler ........................... 411/368 |
| 3,339,215 | A | | 9/1967 | Flood |
| 3,485,134 | A | * | 12/1969 | Ott ................................ 411/372 |
| 3,601,823 | A | | 8/1971 | Isaacs |
| 4,033,243 | A | * | 7/1977 | Kirrish et al. ................. 411/338 |
| 4,490,083 | A | * | 12/1984 | Rebish .......................... 411/338 |
| 4,770,582 | A | | 9/1988 | Junemann et al. |
| 4,999,019 | A | | 3/1991 | Kraus |
| 5,290,131 | A | * | 3/1994 | Henriksen ..................... 411/180 |
| 5,421,036 | A | | 6/1995 | Stevens et al. |
| 6,053,683 | A | * | 4/2000 | Cabiran ..................... 411/372.6 |
| 6,125,479 | A | | 10/2000 | Fraleigh |
| 6,254,141 | B1 | | 7/2001 | Piper |
| 6,305,627 | B1 | * | 10/2001 | Stiner et al. ................... 242/283 |
| 6,371,707 | B1 | | 4/2002 | Schaty |
| 6,698,986 | B2 | | 3/2004 | Fraleigh |
| 7,584,582 | B1 | * | 9/2009 | Hutter, III ................. 52/506.02 |
| 2007/0186336 | A1 | | 8/2007 | Gately |

* cited by examiner

*Primary Examiner* — Flemming Saether
(74) *Attorney, Agent, or Firm* — Norman E. Lehrer

(57) ABSTRACT

A decorative cap and nut for securing a toilet base to a floor includes a top substantially disc-shaped member having an upper disc surface and a lower disc surface. The diameter of said disc-shaped member is substantially greater than the thickness thereof so as to lie substantially flush with the toilet base. A coaxial cylindrically shaped stem extends vertically downwardly from the top and is connected to the lower disc surface. The stem includes an internal thread adapted to be threaded onto a floor bolt that extends upwardly through an aperture in the toilet base. A slot in the upper disc surface can be engaged by a tool for rotating the top and an O-ring located on the under disc surface seals the disc-shaped member to the upper surface of the toilet base. A plug fits within the slot to hide the same. The stem and top can be integrally formed in a single piece or can be made of more than one piece joined together.

1 Claim, 3 Drawing Sheets

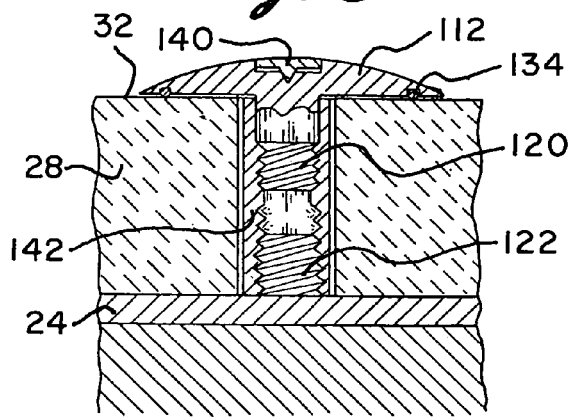
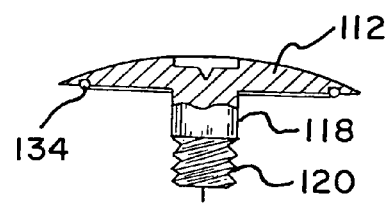
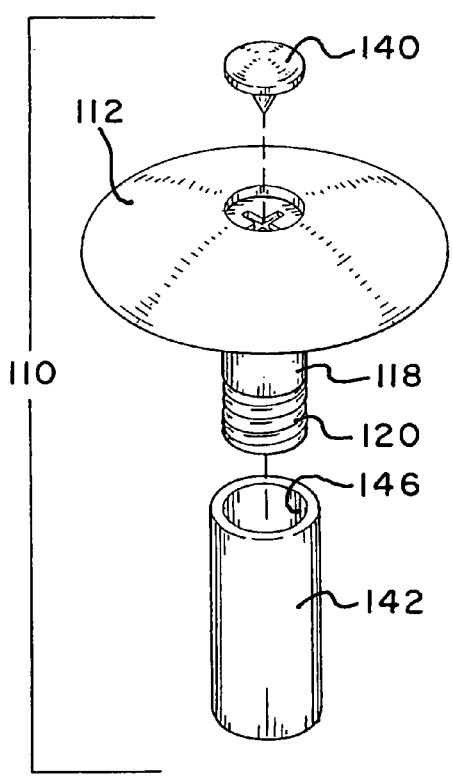
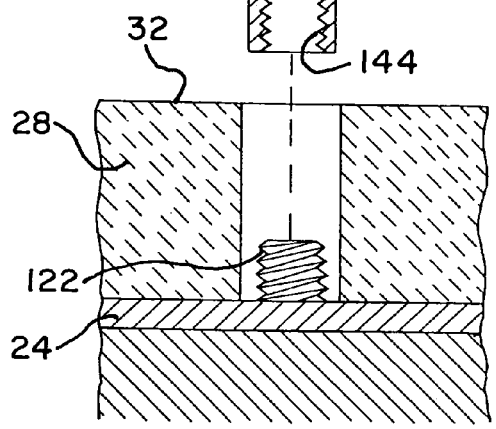

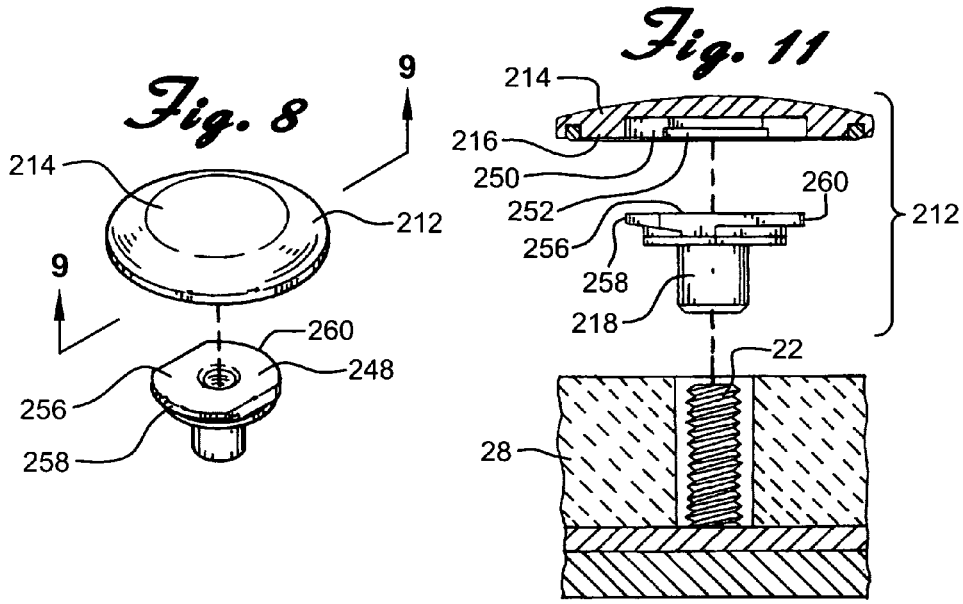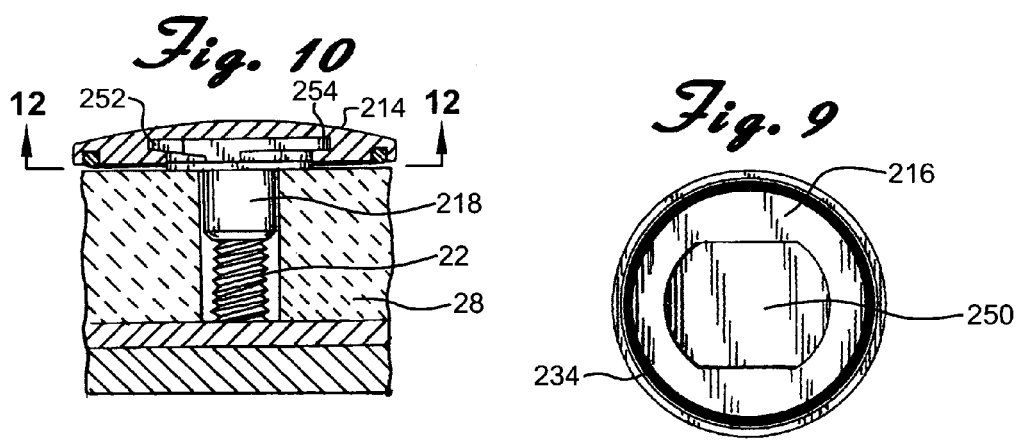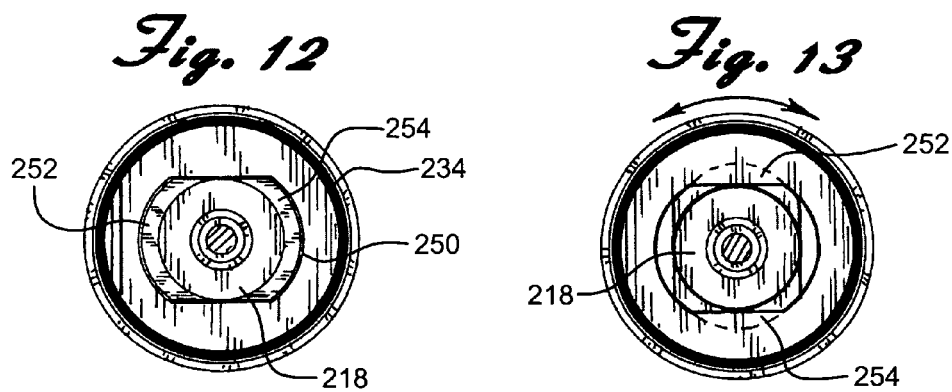

DECORATIVE CAP AND NUT FOR TOILET BASE

CROSS REFERENCE TO RELATED APPLICATIONS

This application is a Continuation-in-Part of prior U.S. application Ser. No. 11/999,362, filed Dec. 5, 2007 now abandoned, which claims the benefit of prior U.S. Provisional Application Ser. No. 60/872,978, filed Dec. 6, 2006.

BACKGROUND OF THE INVENTION

The present invention is directed toward a decorative cap and nut for a toilet base and more particularly, toward a decorative cap and nut that will securely hold the toilet base to the floor, that blends in with the toilet base and that will not easily be dislodged.

Toilets are typically mounted on two loosely mounted vertical bolts that extend upwardly from a circular flange secured to the floor. The mounting of the base of the toilet involves manually lowering the same so that the bolts extend through apertures in the base. When that is accomplished, nuts are tightened downwardly on the upper ends of the bolts against the base of the toilet to securely hold the toilet in place.

To avoid the upper ends of the bolts and the nuts from being exposed, plastic or ceramic caps are typically placed over the upper ends of the bolts. These caps, however, are frequently unsightly and are often displaced during cleaning of the toilet base because they typically extent upwardly a significance distance above the base. Furthermore, the caps often do not completely cover the apertures in the base of the toilet through which the bolts extend. The caps are not watertight, and rust on the bolts soon manifests itself. Putty or adhesive has been placed on the caps to alleviate some of these problems, but that complicates access to the bolts if that ever becomes necessary.

Therefore, a need exists for a decorative cap and nut for toilet base that is effectively secures the toilet but which blends in with the toilet base, is waterproof and is not easily dislodged.

SUMMARY OF THE INVENTION

The present invention is designed to overcome the deficiencies of the prior art discussed above. It is an object of the present invention to provide a decorative cap and nut for a toilet base that is easy to use.

It is another object of the present invention to provide a decorative cap and nut for a toilet base that blends in with the base.

It is a further object of the present invention to provide a decorative cap and nut for a toilet base that provides a watertight seal to prevent water from rusting the bolts holding the toilet in place.

It is an even further object of the present invention to provide a decorative cap and nut for a toilet base that can be used with a variety of different size floor bolts.

In accordance with the illustrative embodiments demonstrating features and advantages of the present invention, there is provided a decorative cap and nut for toilet base that includes a top substantially disc-shaped member having an upper disc surface and a lower disc surface. The diameter of said disc-shaped member is substantially greater than the thickness thereof so as to lie substantially flush with the toilet base. A coaxial cylindrically shaped stem extends vertically downwardly from the top and is connected to the lower disc surface. The stem includes an internal thread adapted to be threaded onto a floor bolt that extends upwardly through an aperture in the toilet base. A slot in the upper disc surface can be engaged by a tool for rotating the top and an O-ring located on the under disc surface seals the disc-shaped member to the upper surface of the toilet base. A plug fits within the slot to hide the same. The stem and top can be integrally formed in a single piece or can be made of more than one piece joined together.

Other objects, features, and advantages of the invention will be readily apparent from the following detailed description of a preferred embodiment thereof taken in conjunction with the drawings.

BRIEF DESCRIPTION OF THE DRAWINGS

For the purpose of illustrating the invention, there are shown in the accompanying drawings forms that are presently preferred; it being understood that the invention is not intended to be limited to the precise arrangements and instrumentalities shown.

FIG. 5 is a cross-sectional view of a second embodiment of the decorative cap and nut for a toilet base taken through line 5-5 of FIG. 1;

FIG. 6 is an exploded perspective view of the second embodiment of a decorative cap and nut for a toilet base;

FIG. 7 is a cross-sectional view similar to FIG. 5 but with the cap and nut removed;

FIG. 8 is an exploded perspective view of the third embodiment of a decorative cap and nut for a toilet base;

FIG. 9 is a bottom plan view taken along the line 9-9 of FIG. 8;

FIG. 10 is a cross-sectional view of the decorative cap and nut of the third embodiment in use securing a toilet base;

FIG. 11 is an exploded view of the third embodiment of a decorative cap and nut for a toilet base of the present invention illustrating how it assembled onto a toilet base;

FIG. 12 is a bottom plan view taken along the line 12-12 of FIG. 10, and

FIG. 13 is a bottom plan view similar to FIG. 12 illustrating how the cap is rotated to secure it to the nut.

DETAILED DESCRIPTION OF THE PREFERRED EMBODIMENT

Figure 1:
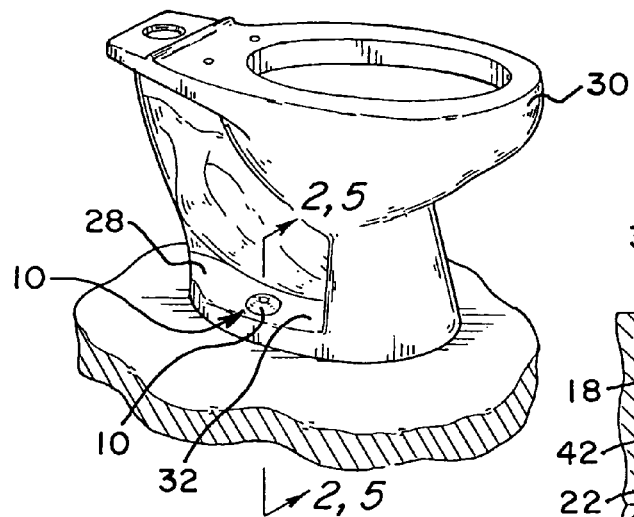
FIG. 1 is a front perspective view of a toilet base employing a first embodiment of the decorative cap and nut of the present invention.

Referring now to the drawings in detail wherein like reference numerals have been used throughout the various figures to designate like elements, there is shown in FIG. 1 a first embodiment of a decorative cap and nut for a toilet base constructed in accordance with the principles of the present invention and designated generally as 10.

The decorative cap and nut for toilet base 10 of the present invention essentially includes a top substantially disc-shaped member 12 having an upper disc surface 14 and a lower disc surface 16. Because the member 12 is essentially disc shaped, its diameter is substantially greater than its thickness. The advantage of this shape will be readily apparent.

A substantially cylindrically shaped stem 18 extends vertically downwardly from the lower surface 16 of the top 12. The cylindrically shaped stem 18 is preferably substantially coaxial with the top 12 and may be integrally formed therewith such as by molding or machining or the like. Preferably, the inside wall of the stem 18 includes an internal thread 20 which is adapted to be threaded onto the floor bolt 22 that extends upwardly from the floor 24 through the aperture 26 in the base 28 of the toilet 30. Alternatively, the internal surface of the stem 18 could be made of a material that is not prethreaded but which is capable of forming threads as it is rotated onto the bolt 22.

Figure 2:
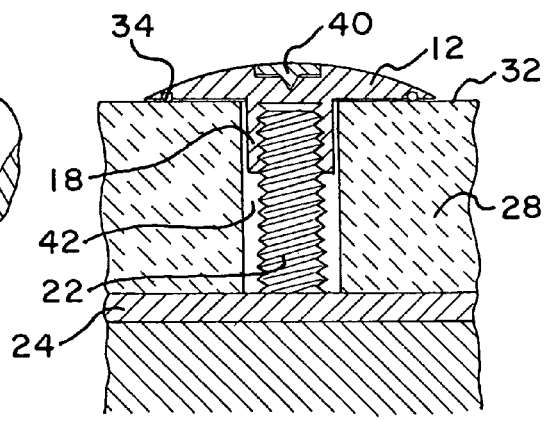
FIG. 2 is a cross-sectional view of the decorative cap and nut for a toilet base taken through line 2-2 of FIG. 1.

In order to provide a watertight seal between the disc-shaped top 12 and the upper surface 32 of the toilet base 28, an elastomeric O-ring or the like 34 is held in a groove or is otherwise secured to the lower surface 16 of the top 12. This seal is best illustrated in FIG. 2. As a result, water or cleaning liquids or the like are prevented from reaching the bolt 22 where it could rust.

Figure 3:
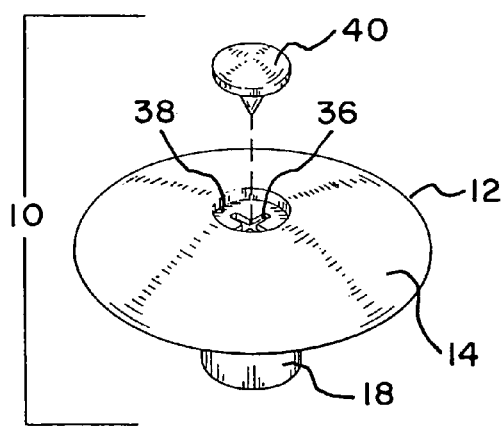
FIG. 3 is an exploded perspective view of the decorative cap and nut for a toilet base of the present invention.
Figure 4:
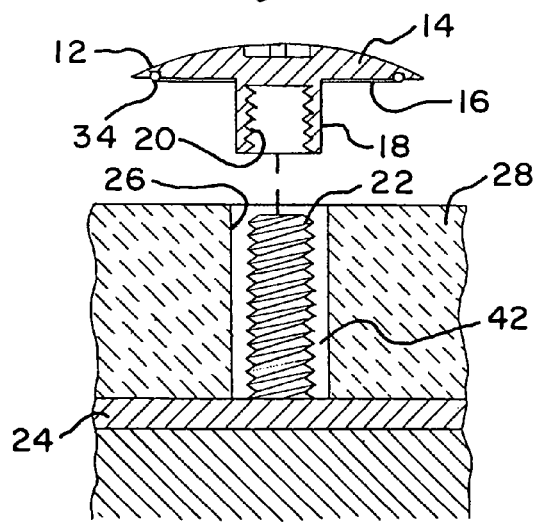
FIG. 4 is a cross-sectional view similar to FIG. 2 but with the cap and nut removed.

Located at the very top center of the upper disc surface 14 is a slot 36. The slot 36 can be engaged by a tool such as a screwdriver or the like so that the entire cap 10 can be rotated so as to thread the stem 18 onto the bolt 12. In the preferred embodiment shown, the slot 36 is in the form of a cross so as to be engaged by a Phillips head screwdriver. Preferably, the slot 36 is recessed slightly into a circular recess 38. To provide a finished appearance, a plug 40 is friction fitted into the recess 38 and slot 36 as shown most clearly in FIGS. 2 and 3.

The decorative cap and nut 10 of the present invention is used in the following manner. As is well known in the art, floor bolts such as shown at 22 are secured to and extend upwardly from the floor 24. In most cases, two such bolts are utilized. For convenience, however, only one is shown in the present drawings. Similarly, and is well known, the base 28 of a toilet 30 has apertures such as shown at 26 that align with the bolts 22 so that the bolts extend upwardly into the aperture. The apertures 26 are normally somewhat rounded but may be slightly elongated for ease of setting the toilet in place.

The outer diameter of the bolt 22 is, of course, smaller than the inside diameter of the aperture 26. As a result, a space 42 remains between the two. If the aperture 26 is circular, the space 42 will be annular in shape. If the aperture 26 is somewhat elongated, then the space 42 will not be precisely annular. For convenience, however, the space 42 will be referred to as annular even though it may be slightly elongated in cross section.

Once the toilet base 28 is put into place, the cap and nut of the present invention is then rotated so that the threads 20 of the stem 18 thread and lock onto the threads of the bolt 22. As shown in FIG. 2, the stem portion 18 then lies in the annular space 42 between the bolt 22 and the base 28. The cap is rotated utilizing a screwdriver or the like that is inserted into the slot 36 until the O-ring 34 engages the top surface 32 of the toilet base 28. Thereafter, the plug 40 is forced down into place to provide the finished appearance as shown in FIGS. 1 and 2.

The decorative cap and nut 10 of the present invention may be made of substantially any material capable of securely fastening the base 28 of the toilet to the floor bolt 22. In addition, it is preferred to have the entire decorative cap and nut 10 be made in a variety of different colors so that they can match the color of the toilet base 28. Alternatively, it is within the scope of the present invention to provide additional snap-on cap members or the like that may be of a variety of different colors that can snap over the tops of the combined cap and nut 10 of the invention.

As can be best seen from FIGS. 1 and 2, once the decorative cap and nut 10 are applied, it presents a very low and smooth profile. This is very different from prior art bolts and caps that extend upwardly above the toilet base. As a result, the caps of the present invention do not interfere with the cleaning of the base of the toilet nor will they become dislodged whereby water or cleaning solutions can rust the bolts.

An alternate form of the invention is shown in FIGS. 5-7 wherein substantially the same reference numerals are used to identify similar elements but are proceeded by a 1. In this second embodiment of the invention, the stem 118 of the decorative cap 110 has an external thread 120. A cylindrical insert 142 having an internal thread 144 at the lower end thereof is adapted to be threaded onto the floor bolt 122. In this embodiment, the floor bolt 122 is shorter than the floor bolt 22 shown in the first embodiment. The upper portion of the cylindrical insert 142 can either have an internal thread which can cooperate with the thread 120 of the stem 118. Alternatively, the inside surface 146 of the cylindrical insert 142 may not be threaded but may be made of a material which allows the thread 120 to be threaded therein. In such a case, the thread 120 is preferably made so as to be of the type that is self tapping.

The arrangement shown in FIGS. 5-7 has an advantage over the first embodiment described above with respect to FIGS. 1-4 in that the decorative cap and nut need not be made so as to be complementary to the thread of the floor bolt. This is sometimes necessary since different size floor bolts have been used over the years. Thus, a variety of different sized cylindrical inserts 142 can be provided. Alternatively, a single size cylindrical insert 142 can be designed that will thread onto substantially any size floor bolt 122.

A third form of the invention is shown in FIGS. 8-13 wherein again substantially the same reference numerals are used to identify similar elements but are proceeded by a 2. In this third embodiment of the invention, the cap and nut of the previous embodiments are formed separately in two parts and are then joined together in use. The combination, identified at 210, includes a substantially disc-shaped cap member 212 and a nut 248.

The cap member 212 has an upper disc surface 214 and a lower disc surface 216. Because the member 212 is essentially disc shaped, its diameter is substantially greater than its thickness. The advantage of this shape is described above with reference to the first embodiments and is equally applicable here. As shown most clearly in FIGS. 9-13, the lower disc surface 216 includes an elongated opening 250 that leads to undercut areas 252 and 254 as shown in FIGS. 10 and 13.

The nut 248 includes a flat top 256 and a substantially cylindrically shaped stem 218 that extends vertically downwardly from the top 256. The flat top is also elongated in shape and is complementary to the shape of the opening 250 in the lower disc surface 216 of the cap member 212. The thickness of the flat top 256, at least at the ends 258 and 260, is such as to fit within the undercut areas 252 and 254 of the cap member 212.

The decorative cap and nut 210 of this embodiment of the invention is used in the following manner. As in the first embodiment, the base 28 of the toilet 30 is put into place over the floor bolts 22 that extend upwardly from the floor 24. If necessary, the tops of the bolts are then cut off utilizing a hack saw or the like.

Once the toilet base 28 is put into place, the nut 248 is placed over the bolt 22 and is rotated so that the internal threads (not shown) of the stem 218 thread and lock onto the threads of the bolt 22. In some installations, it may be desirable to place a washer around the stem 218. Because the flat top of the nut 248 is oblong, it can be easily grasped by a wrench, if necessary in order to tighten the same.

With the nut 248 securing the toilet base 28 to the floor, the cap 212 is placed over the nut and aligned so that the top of the nut 248 enters the opening 250 in the bottom surface 216 of the cap. At that point, the cap 212 is rotated by hand one-quarter turn until the ends 258 and 260 of the top of the nut 248 enter the undercut areas 252 and 254 of the cap member 212 to secure the cap member in place.

The foregoing described arrangement for attaching the cap member 212 to the nut 248 is similar to what is commonly referred to as a bayonet attachment. It should be readily apparent, however, that the invention is nor limited thereto. For example, it may also be possible to secure the bolt in place and provide a cap that resembles cap member 212 but which simply snaps in place over the nut.

As with the first embodiments of the invention discussed above, in order to provide a watertight seal between the cap 212 and the upper surface 32 of the toilet base 28, an elastomeric O-ring or the like 234 is held in a groove or is otherwise secured to the lower surface 216 of the cap 212. In this embodiment, this seal is best illustrated in FIG. 10.

The present invention may be embodied in other specific forms without departing from the spirit or essential attributes thereof and accordingly, reference should be made to the appended claims rather than to the foregoing specification as indicating the scope of the invention.

I claim:

1. A decorative cap and nut for securing a toilet base to a floor wherein said base has an upper base surface and includes an aperture extending therethrough, said aperture including an inner wall and wherein a floor bolt having an external thread extends vertically upwardly from the floor into said aperture, said floor bolt having a diameter that is less than said aperture whereby at least an annular space remains between said floor bolt and said aperture, said decorative cap and nut comprising:

a top substantially disc-shaped member having an upper disc surface and a lower disc surface, the diameter of said disc-shaped member being substantially greater than the thickness thereof;

said nut including a substantially cylindrically shaped stem extending vertically downwardly therefrom, said nut and stem being a separate piece from said top but connected to said lower disc surface and being substantially coaxial therewith and extending vertically downwardly from said top, said stem including an internal thread adapted to be threaded onto said floor bolt with at least a portion of said stem being located in said annular space, said nut further having a substantially flat oblong shaped upper surface;

said top being in the form of a cap having a lower surface with an opening therein and having undercut portions for accepting the upper surface of said nut, said opening in said lower surface being formed such that said cap can be placed over said nut after said stem and nut are secured to said bolt and said cap can then be rotated approximately one quarter turn to secure said cap to said nut, and an O-ring located on said under disc surface for sealing said disc-shaped member to said upper base surface.

* * * * *